Patented Feb. 13, 1945

2,369,611

UNITED STATES PATENT OFFICE 2,369,611

ANALGETICALLY EFFECTIVE TETRAHYDRONAPHTHALENE PIPERIDYL DERIVATIVES

Georg Scheuing and Bruno Walach, Ingelheim-on-the-Rhine, Germany; vested in the Alien Property Custodian No Drawing. Application December 16, 1939, Serial No. 309,702. In Germany December 24, 1938

2 Claims. (Cl. 260—293)

This invention relates to new analgetically effective tetrahydronaphthalene derivatives and to process for their production.

According to the invention the production of the new compounds takes place in such a manner, that 1-oxo-2-halogen compounds of the tetrahydronaphthalene of the general formula

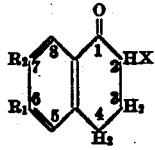

in which X means one halogen atom have substituted in the 2-position a hydrogenated heterocyclic nitrogen base, such as piperidine, tetrahydroisoquinoline or derivatives of these compounds according to known methods to form new compounds which have the general formula

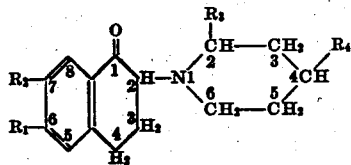

or

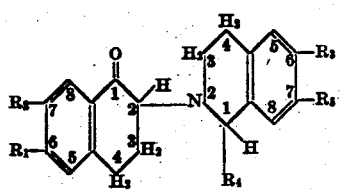

In these formulae $R_1$ and $R_2$ indicate hydrogen atoms, oxy-, alkyloxy- or alkyl groups and $R_3$, $R_4$ and $R_5$ indicate hydrogen atoms, alkyl- or alkyloxy groups.

The production of the new compounds can take place for instance by substituting 1-oxo-2-halogen tetrahydronaphthalene in presence of organic solvents with the hydrogenated base, filtering off from the hydrohalide produced as by-product, and extracting the amino ketone contained in the organic solvent and formed in the conversion by dilute acids.

For 1 mol of β-halogen-α-tetralon preferably at least 2 mol of nitrogen base are used, as at the conversion 1 mol of hydrohalide is formed, which is bound by 1 mol base. The reaction is carried out preferably with an excess of base, which amounts to about 2.5–3.5 mol.

The solvents which are to be taken into consideration for the conversion of the initial materials are for instance benzene, acetone, ethyl alcohol, propyl alcohol, butyl alcohol, toluene, xylene, dioxane and higher boiling ethers such as propyl ether and butyl ether. Water-free methyl alcohol is not a solvent applicable to the present invention. It is well to carry out the reaction at increased temperature, and preferably at such temperatures which correspond to the boiling temperatures of the organic solvents which are used.

Although β-bromide-α-tetralins are generally employed as initial materials, the corresponding chlorine and iodine compounds are also suitable, although these are less easily accessible.

The new compounds may be obtained also in such a manner, that not the hydrogenated heterocyclic nitrogen bases, but the unhydrogenated substances are brought to conversion. Instead of piperidine, for instance pyridine may be used. But in this instance it is necessary to hydrogenate the pyridine ring in the product obtained, which may be carried out for instance with employment of platinum as catalyst.

The amino ketone produced in the conversion is extracted with acids from the selected organic solvent. For the extraction dilute mineral acids such as hydrochloric acid, sulphuric acid or organic acids such as tartaric acid, citric acid and lactic acid may be used.

In the following the production of the new compounds will be explained on the basis of some examples, without limitation of the invention to the materials, quantity, proportions and temperatures employed in the examples.

*Example 1—1-oxo-2-N-piperidyl-1,2,3,4-tetrahydronaphthalene*

225 grams of β-bromine-α-tetralon (1.0 mol) are dissolved in 200 ccm. of benzene and this solution is added to a boiling solution of 260 grams piperidine in 300 ccm. of benzene. Strong reaction takes place immediately. 154 grams piperidine hydrobromide (93% of the theoretical) separate out. From the benzolic solution the amino ketone is separated out by dilute acids, the acid extract is alkalized and extracted with benzol. The benzolic solution evaporation leaves behind 140 grams 1-oxo-2-N-piperidyl-1,2,3,4-tetrahydronaphthalene (70% of the theoretical) having the boiling point at 0.3 mm. Hg 172°. The colourless hydrochloride, which is obtained according to usual methods by conversion with the stoichiometric quantity of hydrochloric acid, shows the melting point 220° C.

Example 2—6-methoxy-1-oxo-2-N-piperidyl-1,2,3,4-tetrahydronaphthalene 382 grams 6-methoxy-2-brom-1-oxo-1,2,3,4-tetrahydronaphthalene (1.5 mol) of the melting point 81° are dissolved in 600 ccm. toluene, and this solution is poured into a boiling solution of 400 grams piperidine (4.7 mol) with 750 ccm. toluene. After slight reaction piperidine hydrobromide separates out quickly. The solution is heated for some time on the water bath, then sucked off from the separated out piperidine hydrobromide (240 grs.=96.2% of the theory), and the amino ketone is extracted by dilute acids from the solution in toluene. From the acid solution the amino ketone is separated by dilute alkalis as thick oil taken up by an organic solvent such as benzol or ether. The residue remaining after the expulsion of the solvent is distilled or directly worked to hydrochloride or to other salts. 325 grams 6-methoxy-1-oxo-2-N-piperidyl-1,2,3,4-tetrahydronaphthalene (mol weight 259) of the boiling point 0.5 mm. 195° C. (83.8% of the theory) are obtained as thick oil, which solidifies to a crystalline mass. The colourless base can be re-crystallised from ether and then melts at 68°. The hydrochloride is produced therefrom according to usual methods and shows a melting and decomposition point of 202°.

Example 3—6-oxy-1-oxo-2-N-piperidyl-1,2,3,4-tetrahydronaphthalene 85 grams 6-acetoxy-1-oxo-2-brom-1,2,3,4- tetrahydronaphthalene (=0.3 mol) are reacted in benzol with 100 grams piperidine. After the usual treatment for the production of the amino ketone salt (compare Example 1), 51 grams 6-oxy-1-oxo-2-N-piperidyl-1,2,3,4-tetrahydronaphthalene are obtained. The hydrochloride has a melting point of 162°. The yield amounts to 60% of the theory.

A similar composition is obtained by dealkylation of 6-methoxy- or 6-ethoxy-1-oxo-2-N-piperidyl-1,2,3,4-tetrahydronaphthalene, which can be obtained in a similar manner as the compound according to Examples 1 and 2, by means of boiling 40–45% hydrobromic acid.

Example 4—6-methoxy-1-oxo-2-N-tetrahydroisoquinolyl-1,2,3,4-tetrahydronaphthalene 180 grams 6-methoxy-1-oxo-2-bromine-1,2,3,4-tetrahydronaphthalene (0.7 mol) are converted with 270 grams tetrahydroisoquinoline in 700 ccm. xylene. 172 grams 6-methoxy-1-oxo-2-N-(tetrahydroisoquinolyl) 1,2,3,4 - tetrahydronaphthalene are obtained with a yield of 80% of the theory of the melting point 130–132° (from acetone). The hydrochloride has a melting point of 215°.

Example 5—6-methoxy -1- oxo-2-N-(6-ethoxy-1-methyl - 1,2,3,4 - tetrahydroisoquinolyl) 1,2,3,4-tetrahydronaphthalene 77 grams 6-methoxy-1-oxo-2-bromine-1,2,3,4-tetrahydronaphthalene (0.3 mol) are converted at the boiling point with 160 grams 6-ethoxy-1-methyl-1,2,3,4-tetrahydroisoquinoline in 400–500 ccm. propyl alcohol. 58 grams 6-methoxy-1-oxo-2-N-(6-ethoxy - 1 - methyl-1,2,3,4-tetrahydroisoquinolyl) 1,2,3,4-tetrahydronaphthalene are obtained with a yield of 55% of the theory of the melting point 130°. The hydrochloride has a melting point of 192°.

Example 6—6-methoxy-1-oxo-2-N-piperidyl-1,2,3,4-tetrahydronaphthalene 38 grams 6-methoxy-2-brom-1-oxo-1,2,3,4-tetrahydronaphthalene (0.15 mol) are dissolved cold with 40 grams piperidine (0.47 mol) in 150 ccm. acetone and the temperature of the solution is maintained at 20° by cooling. After some time 23 grams piperidine hydrobromide (93% of the theoretical) separate out. The acetone solution is worked up to amino ketone according to Example 1. 23 grams 6-methoxy-1-oxo-2-N-piperidyl-1,2,3,4-tetrahydronaphthalene of the boiling point 172° at 0.2 mm. Hg are obtained. The melting point of the substance re-crystallised from ether amounts to 68°. The hydrochloride has a melting point of 202°. The yield amounts to 59% of the theory.

Example 7—6-methoxy-1-oxo-2-N-piperidyl-1,2,3,4-tetrahydronaphthalene 38 grams 6-methoxy-2-brom-1-oxo-1,2,3,4-tetrahydronaphthalene (0.15 mol) are dissolved warm in 150 ccm. alcohol and poured into a boiling solution of 40 grams piperidine (0.47 mol) and 150 ccm. alcohol. After boiling for one hour the reaction is carried out as in Example 1. 27 grams 6-methoxy -1- oxo-2-N-piperidyl-1,2,3,4-tetrahydronaphthalene of the boiling point 172° at 0.2 mm. Hg are obtained. The melting point amounts to 68°. The hydrochloride has a melting point of 202°. The yield amounts to 70% of the theory.

Example 8—6-methoxy-1-oxo-2-N-piperidyl-1,2,3,4-tetrahydronaphthalene 20 grams 6-methoxy-1-oxo-1,2,3,4-tetrahydronaphthalene-2-pyridinium bromide (0.06 mol) of the melting point of 250°, produced from molecular quantity 6-methoxy-1-oxo-2-brom-1,2,3,4-tetrahydronaphthalene and pyridine in xylene, are catalytically hydrogenated in methylalcoholic solution with platinum as catalyst. After a rapid absorption of 0.18 mol hydrogen, the hydrogen absorption comes to a standstill. When working up the reaction solution to amino ketone according to Example 1, 14.5 grams 6-methoxy-1-oxo-2-N-piperidyl-1,2,3,4 - tetrahydronaphthalene of the boiling point 172° at 0.2 mm. Hg are obtained. The melting point amounts to 68°. The hydrochloride has a melting point of 202°. The yield amounts to 93% of the theory.

Example 9—6-methoxy-1-oxo-2-N-α-pipecolyl-1,2,3,4-tetrahydronaphthalene 51 grams 6-methoxy - 1 - oxo-2-brom-1,2,3,4-tetrahydronaphthalene (0.2 mol) are treated in a boiling dioxane with 60 grams α-pipecoline (0.6 mol). 35 grams α-pipecoline hydrobromide (98% of the theory) separate out. When completing the working up of the reaction solution to amino ketone, 33 grams 6-methoxy-1-oxo-2-N-α-pipecolyl-1,2,3,4-tetrahydronaphthalene of the boiling point 192° at 1.6 mm. Hg are obtained. The hydrochloride has a melting point of 192°. The yield amounts to 60% of the theory.

Example 10—7-methyl-1-oxo-2-N-(2'4'dimethyl) piperidyl-1,2,3,4-tetrahydronaphthalene 141 grams 7 - methyl - 1 - oxo-2-brom-1,2,3,4-tetrahydronaphthalene (0.59 mol) are treated with 200 grams 2.4-dimethyl-piperidine (1.77 mol) in 450 ccm. n-propyl ether (or n-butyl ether). 168 grs. hydrobromide of the 2.4 dimethylpiperidine (93.5% of the theory) are obtained. Of amino ketone are obtained 80 grams 7-methyl - 1-oxo-2-N(2'4'dimethylpiperidyl) -1,2, 3,4,-tetrahydronaphthalene of the boiling point 165° at 0.25 mm. Hg. The yield amounts to 50% of the theory. The hydrochloride has a melting point of 220° with decomposition.

*Example 11—7-methoxy-1-oxo-2-N(2'4'dimethyl)piperidyl-1,2,3,4-tetrahydronaphthalene*

128 grams 7-methoxy-1-oxo-2-brom-1,2,3,4-tetrahydronaphthalene (0.5 mol) of the melting point of 84° are boiled with 170 grams 2.4-dimethylpiperidine (1.5 mol) in 370 ccm. benzol. 93 grams hydrobromide of the 2.4 dimethylpiperidine (96% of the theory) are obtained. Of amino ketone are obtained 80 grams 7-methoxy-1-oxo-2-N(2'4'-dimethyl)piperidyl-1,2,3,4-tetrahydronaphthalene of the boiling point 168° at 0.3 mm. Hg. The yield amounts to 56% of the theory. The hydrochloride has a melting point from 198 to 200° with decomposition.

*Example 12—6-methoxy-1-oxo-2-N(2'4'dimethyl)piperidyl-1,2,3,4-tetrahydronaphthalene*

255 grams 6-methoxy-1-oxo-2-brom-1,2,3,4-tetrahydronaphthalene (1.0 mol) are boiled with 270 grams 2.4-dimethylpiperidine (2.4 mol) in 800 ccm. toluene. 97% of the theory are obtained of the hydrobromide of the dimethylpiperidine. By means of tartaric acid solution, of amino ketone are isolated 287 grams 6-methoxy-1-oxo-2-N(2'4'dimethyl)piperidyl-1,2,3,4-tetrahydronaphthalene (75% of the theory) of the boiling point 180° at 0.36 mm. Hg. The hydrochloride has a melting point of 203° with decomposition.

*Example 13—1-oxo-2-N(2'4'dimethyl)piperidyl-1,2,3,4-tetrahydronaphthalene*

225 grams β-brom-α-tetralon (1 mol) are converted with 300 grams 2.4-dimethylpiperidine (2.65 mol) in 1000 ccm. xylene at 120°. 186 grams hydrobromide (96% of the theory) are isolated. The amino ketone is extracted by means of citric acid solution. 103 grams 1-oxo-2-N(2'4'dimethyl)piperidyl-1,2,3,4-tetrahydronaphthalene (40% of the theory) of the boiling point 158° at 0.2 mm. Hg are obtained. The hydrochloride has a melting point of 232° with decomposition.

All temperatures are given on the centigrade scale.

We claim:

1. An analgetically effective substance of the constitution 6-methoxy-1-oxo-2-N-piperidyl-1,2,3,4-tetrahydronaphthalene.

2. Analgetically effective substances, being compounds selected from the class consisting of 6- and 7-methoxy-1-oxo-2-N(2'4'dimethyl)piperidyl-1,2,3,4-tetrahydronaphthalene.

GEORG SCHEUING.
BRUNO WALACH.